Clark & Garretson,
Mop Holder.
N° 54,860. Patented May 22, 1866.
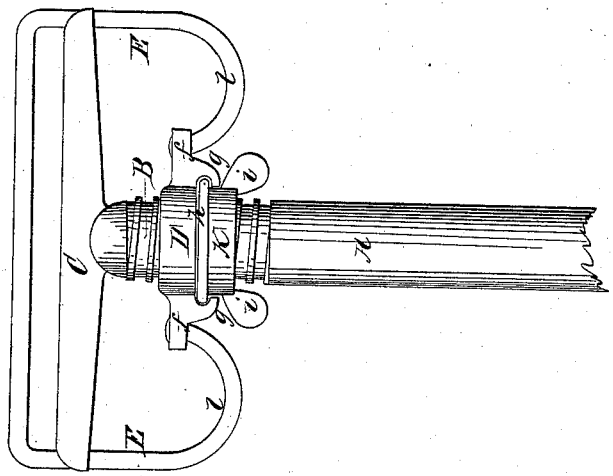
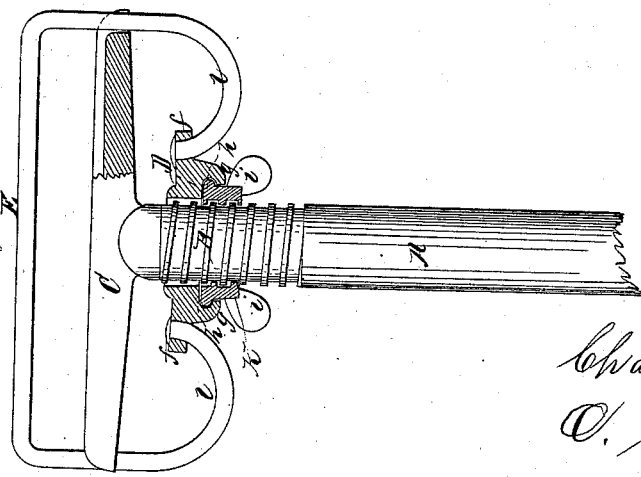
Witnesses:
James Calkins
Jay Hyatt
Inventors.
Chas. B. Clark
O. S. Garretson
By their attorneys
J. Fraser & Co.

UNITED STATES PATENT OFFICE.

CHAS. B. CLARK AND O. S. GARRETSON, OF BUFFALO, NEW YORK.

IMPROVED MOP-HEAD.

Specification forming part of Letters Patent No. 54,860, dated May 22, 1866.

*To all whom it may concern:*

Be it known that we, CHAS. B. CLARK and O. S. GARRETSON, of the city of Buffalo, in the county of Erie and State of New York, have invented a new and useful Improvement in the Construction of Mop-Heads; and we do hereby declare that the following is a full and exact description thereof, reference being had to the accompanying drawings, in which—

Figure 1 is a view in elevation, the collar D, nut K, and a part of the fixed head C being shown in section. Fig. 2 is a similar view with all the parts represented in elevation.

Like letters indicate corresponding parts in both figures.

It is the object of our invention to simplify the construction of mop-heads and obviate some of the defects of those in use, having reference to the fact that they are used mainly by persons of the least mechanical skill, and also to reduce their cost; and it consists in the combination of a collar provided with wings or their equivalent, which carry the movable jaw and an adjusting-nut with which it is connected by means of a flange and lugs with a threaded shank and fixed cross-head, and also in the manner of connecting the wire frame, which constitutes the movable jaw, with the arms of the collar before mentioned.

As represented in the drawings, A is a portion of the mop-handle. B is a threaded shank attached to said handle, the latter being secured in a socket in the same, and C a cross-head, being cast as a portion of the shank and which constitutes the fixed or immovable jaw of the mop-head.

The collar D has no internal thread, but slides easily on the shank B. It is provided with two arms, *f f*, through which are riveted the two ends of the bent wire E, which forms the movable jaw.

Back from the arms project the lips *g g*, which are of a hooked form and embrace the flange *h* of the nut K. This nut is provided with thumb-pieces *i i* or other convenient means of turning it, and is threaded to correspond with the thread of the shank B. By turning the nut it traverses the shank and moves the collar D (and with it the jaw E) forward and back, according to the direction in which it is turned, the hooked lugs *g g* and flange *h* connecting them, so that they advance and recede together. The flange *h* fits easily in the lugs, to admit of the nut being turned with little friction, and the collar is prevented from turning by the parallel sides of the jaw E, which move in a groove or recess in each end of the jaw C, by which the two jaws are connected.

The lugs *g g* may be placed on the nut, and the flange *h* on the collar, with the same effect; or a greater number of lugs than two may be employed if desired; or an annular flange on the collar may be extended over and around the flange of the nut, or the nut elongated to extend through the collar, and the two secured together by any ordinary means known to mechanics, all of which would be equivalents both in effect and construction, provided they accomplish the one end essential to the operation of this invention—viz., the connecting of the collar and nut together so that the latter revolves freely, but both advance and recede as one.

The screw of the shank is preferably provided with a left-hand thread, and, turning the nut to the right, as usual, moves the collar back and makes the movable jaw approach the stationary one and compress the mop-cloth, while a reverse motion loosens it. This arrangement adapts it to unskilled persons, who naturally turn to the right to tighten a mop.

The bows *l l* of the jaw E are bent so as to terminate in a direction pointing toward the mop, so that the strain to which they are subjected in compressing the cloth holds them in their sockets in the arms *f f*, so that the greater the strain the less liable they are to give way. This arrangement secures several important results. In ordinary mop-heads this joint is most likely to fail of any part, being usually riveted, and the constant strain tending to wear or break off the rivet-head. By this method very slight riveting only is required, thereby saving labor and cost. It also enables the collar D to be moved closely against the fixed jaw C in opening the jaws to the proper width, by reason of which the screw-shank may be shortened materially, rendering the mop-head lighter, more compact, and symmetrical than is attained by the ordinary mode of construction.

It is a common defect of mop-heads to be constructed with a swivel or pivot, on which one or the other of the jaws turns to loosen or tighten the cloth. This swivel, being kept constantly damp, soon rusts so much as to become useless, and the mop-head is in consequence discarded. Our device obviates this defect, and enables us to make the shank and jaw C of a single piece, securing all the strength of metal at their junction required.

What we claim as our invention, and desire to secure by Letters Patent, is—

1. Connecting the nut K with the collar which carries the movable jaw E E by means of the lugs $g\ g$ or their equivalent, in combination with the threaded shank of the jaw C, arranged and operating substantially as set forth.

2. Connecting the movable jaw E E with the collar D, by means of the bows $l\ l$, constructed and operating substantially in the manner and for the purposes specified.

In witness whereof we have hereunto signed our names in the presence of two subscribing witnesses.

C. B. CLARK.
O. S. GARRETSON.

Witnesses:
JAY HYATT,
LYMAN P. PERKINS.